United States Patent [19]

Guimond et al.

[11] Patent Number: 4,508,801

[45] Date of Patent: * Apr. 2, 1985

[54] LEAD ACID BATTERY WITH SELF-REGISTERING GRID COMPLEMENT AND METHODS OF MAKING AND OPERATING SAME

[75] Inventors: Roy A. Guimond, Holden; John E. Gulliksen, Shrewsbury; Nanci W. Reed, Sudbury, all of Mass.

[73] Assignee: Koehler Manufacturing Company, Marlborough, Mass.

[*] Notice: The portion of the term of this patent subsequent to Aug. 25, 1998 has been disclaimed.

[21] Appl. No.: 299,157

[22] Filed: Sep. 3, 1981

Related U.S. Application Data

[63] Continuation-in-part of Ser. No. 239,159, Feb. 27, 1981, Pat. No. 4,359,509.

[51] Int. Cl.³ .................... H01M 4/76; H01M 2/18; H01M 10/44/6/00
[52] U.S. Cl. .................... 429/238; 429/140; 429/234; 429/50; 141/1.1; 29/2; 29/623.1
[58] Field of Search ............... 429/131, 140, 141–144, 429/234, 238, 239, 240, 225, 227, 226, 50; 141/1.1; 29/623.1, 2

[56] References Cited

U.S. PATENT DOCUMENTS

| | | | |
|---|---|---|---|
| 2,420,456 | 5/1947 | White | 429/238 |
| 3,462,305 | 8/1969 | Fahrbach | 29/2 |
| 3,733,220 | 5/1973 | Cortese et al. | 429/227 |
| 3,933,524 | 1/1976 | Hughel et al. | 429/226 |
| 4,025,701 | 5/1977 | Sundberg | 429/238 |
| 4,285,121 | 8/1981 | Guimond et al. | 29/623.1 |
| 4,303,746 | 12/1981 | Gulliksen | 429/140 |
| 4,359,509 | 11/1982 | Guimond et al. | 429/140 |

Primary Examiner—Brian E. Hearn
Assistant Examiner—Stephen J. Kalafut
Attorney, Agent, or Firm—Hamilton, Brook, Smith & Reynolds

[57] ABSTRACT

A lead-acid battery construction comprises a casing, electrolyte means received in the casing and positive and negative electrode means mounted in the casing in contact with the electrolyte and being spaced apart by separator means. The positive electrode means includes a shaped grid structure having a top bar, a lug and depending spine portions, and further includes active material contained within tube means held in contact with the spines. An enclosure body is located around portions of the shaped grid structure in a position to selectively prevent flow of current from surfaces of the grid structure not in contact with active material. The enclosure body consists of self-registering plastic grid complement means and is formed with depending parts which are engaged inside distended upper ends of the tube means.

A further inventive aspect resides in a method of engaging grid complement means with shaped grid structure means. The method is characterized by angularly displacing self-registering side portions of the grid complement means as they are moved into engagement with one part of the shaped grid structure means. Thereafter, with further engagement of the grid complement means, the self-registering side portions contract and move into contact with another part of the shaped grid structure in registered relationship therewith.

8 Claims, 32 Drawing Figures

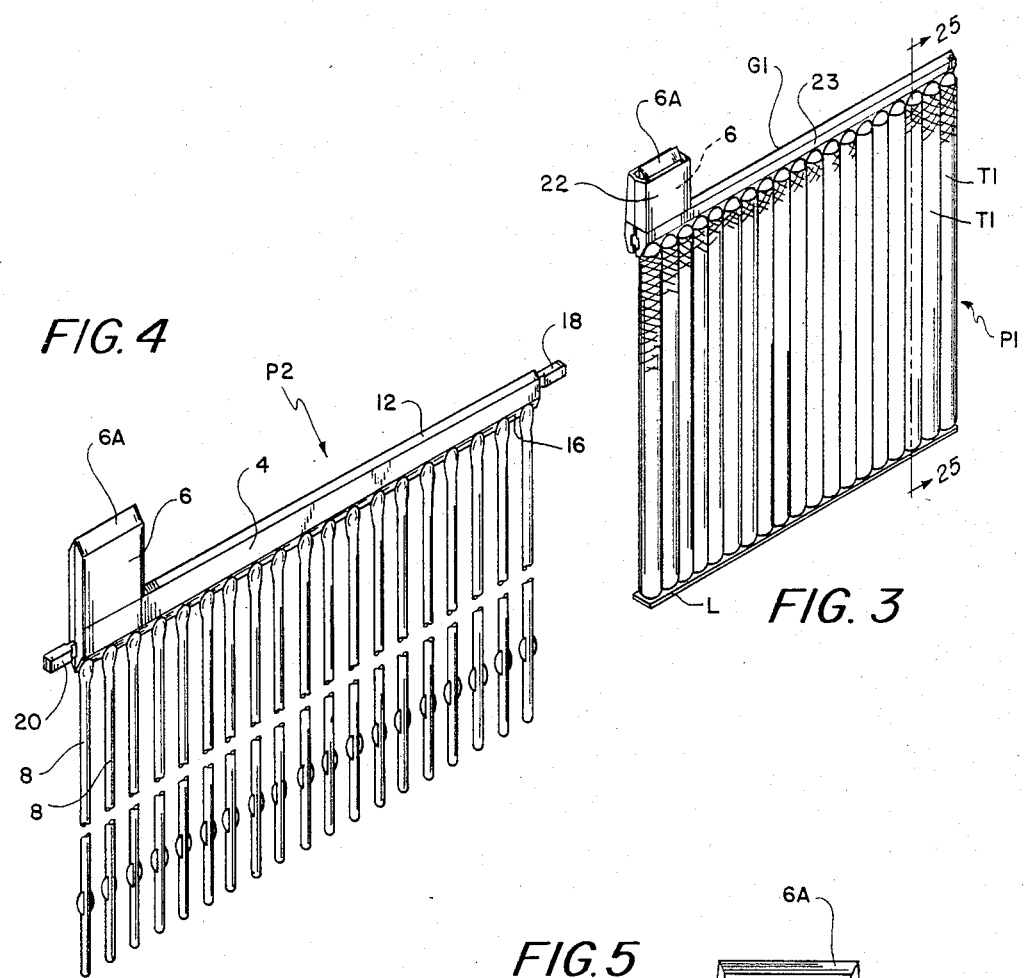
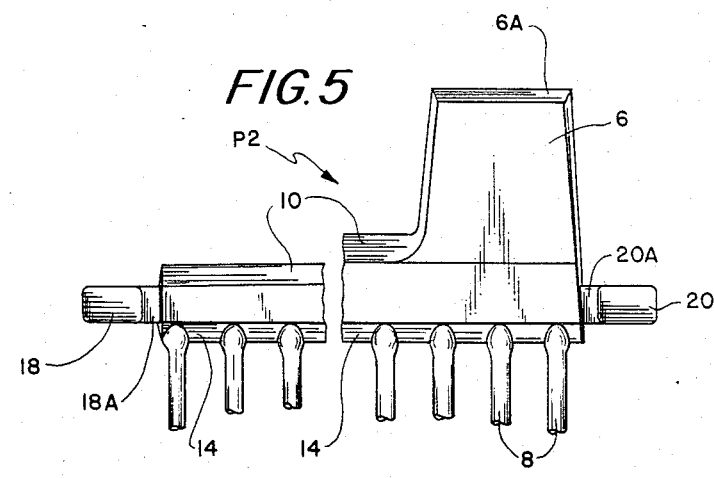
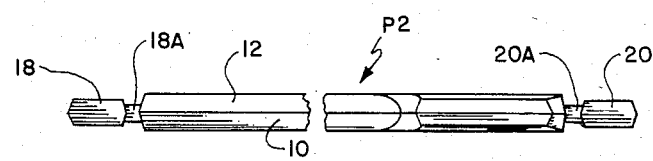

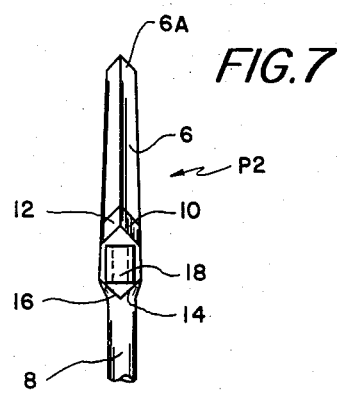
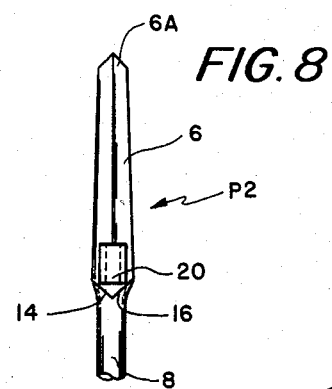
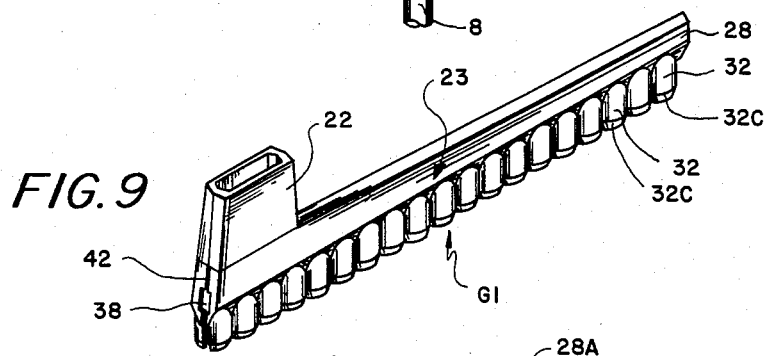
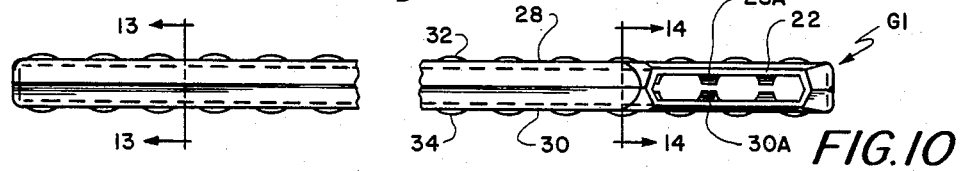
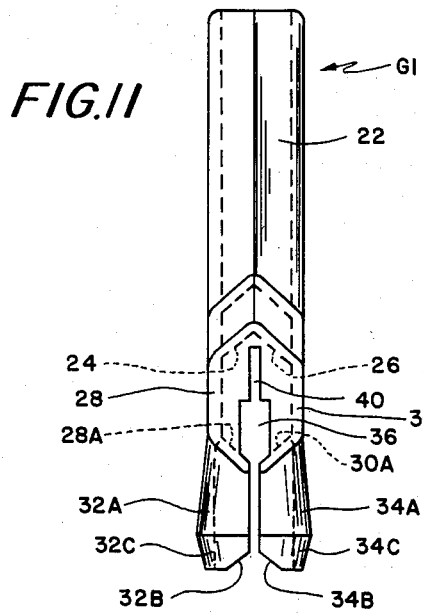
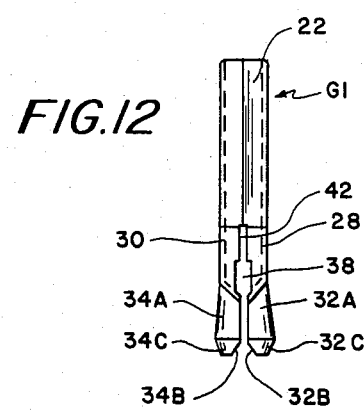

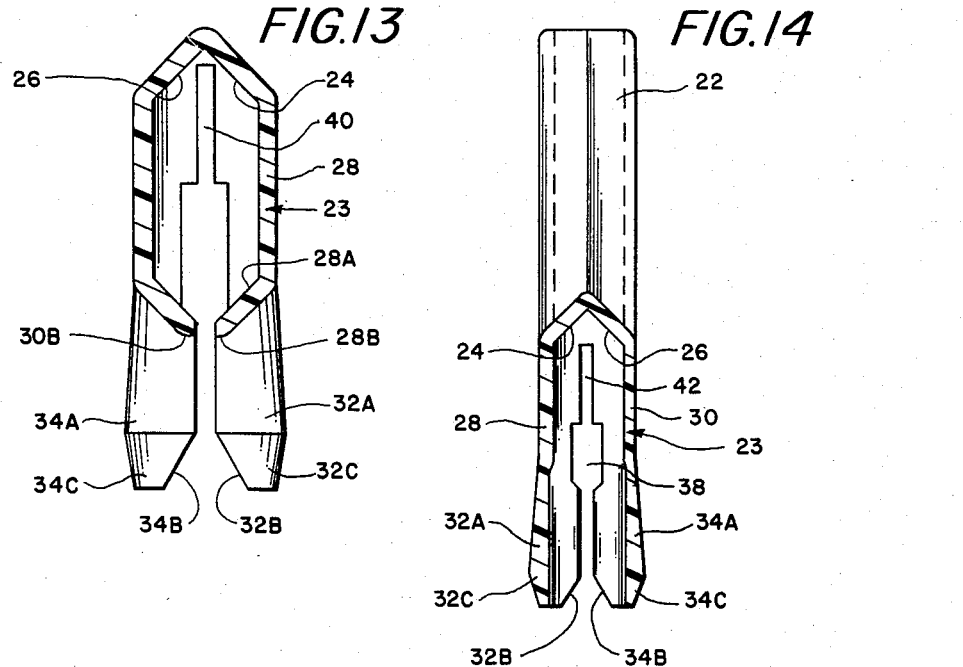
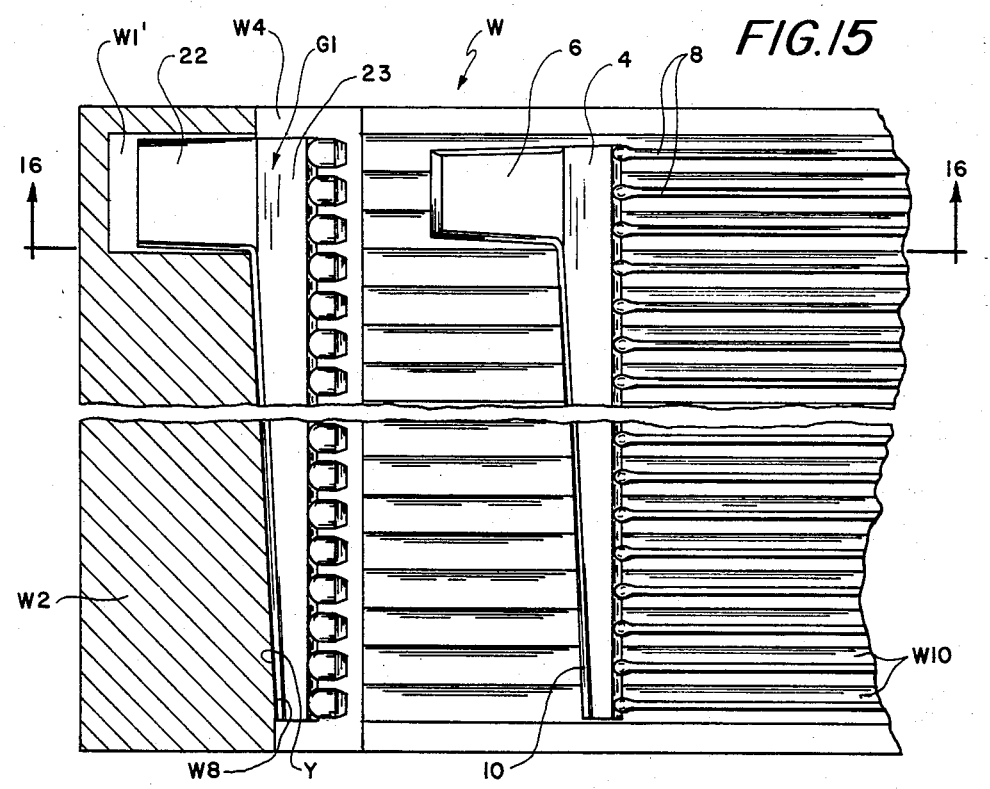

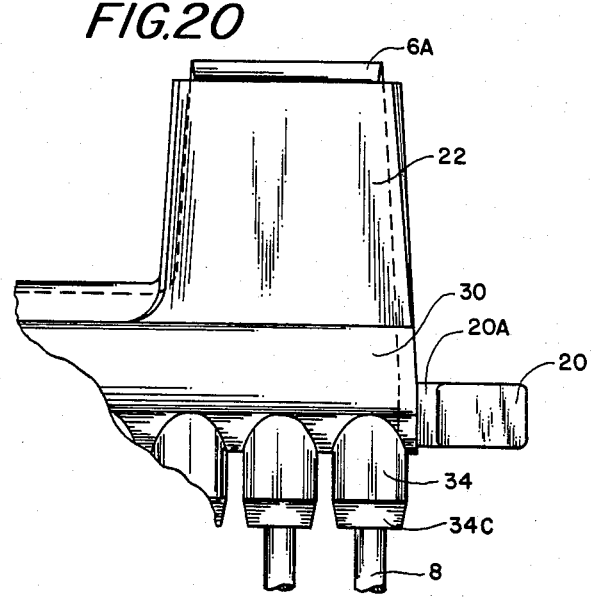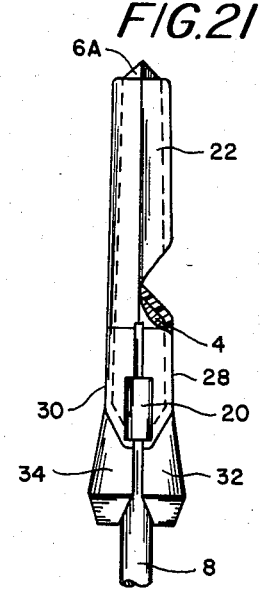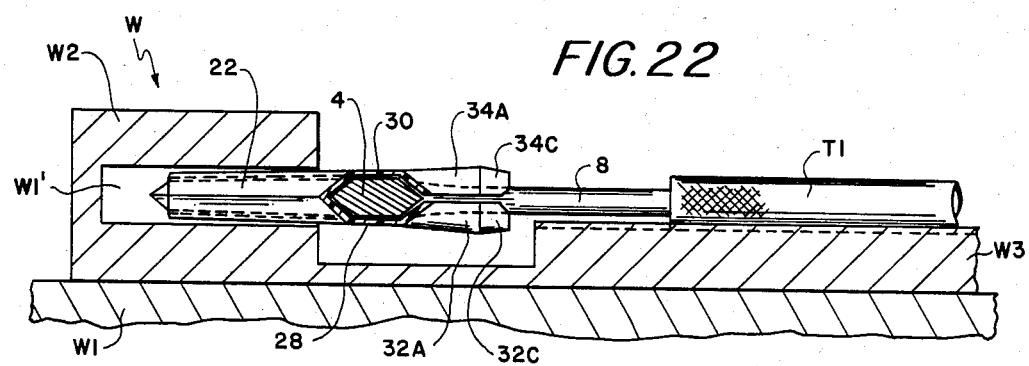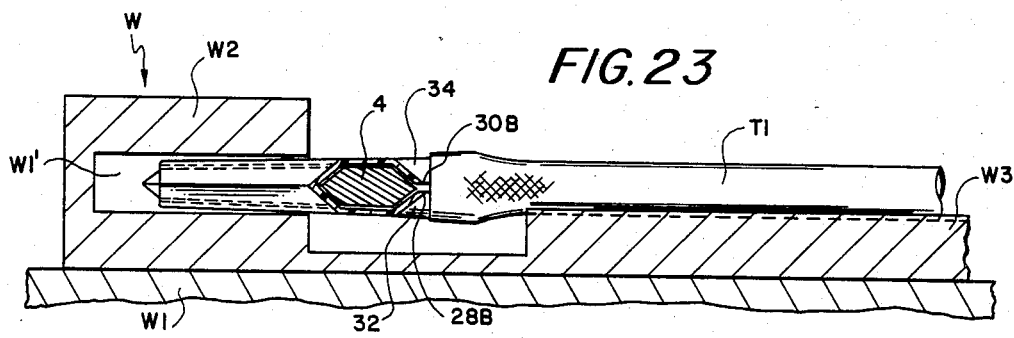

LEAD ACID BATTERY WITH SELF-REGISTERING GRID COMPLEMENT AND METHODS OF MAKING AND OPERATING SAME

This application is a continuation-in-part of Ser. No. 239,159, filed Feb. 27, 1981, now U.S. Pat. No. 4,359,509.

FIELD OF THE INVENTION

In operating a conventional lead-acid battery periodic "cycling" including charging and discharging is customarily carried out. Charging is accomplished using battery charging means, and a standard charging procedure is to continue charging until the battery has been overcharged to some extent. For example, the battery may have a rated discharge capacity expressed in terms of ampere-hours and may be overcharged to 115% of such capacity. Under these conditions an appreciable amount of the charging current may be dissipated or wasted in an undesirable fashion with an energy loss taking place.

Similarly, in a battery being discharged there may occur undesirable paths of current flow causing a wastage of energy. This unnessary dissipation of energy should be minimized.

During periods when a battery may be required to be on "standby" it is customary to maintain the battery at a desired state of charge. This is ordinarily accomplished by "trickle charging", during which a further unwanted dissipation of energy may occur.

Because of rising energy costs there exists a definite need for improvements in efficiency in the operation of lead-acid batteries.

SUMMARY OF THE INVENTION

The present invention relates to an improved lead-acid battery having a shaped grid structure means and self-registering grid complement means engageable with the shaped grid structure means. The invention is also concerned with methods of making a lead-acid battery and with energy efficient methods of operating same.

It is a chief object of the invention to provide a battery having an improved positive electrode construction characterized by specially formed grid structures and grid complement means designed to combine with one another in a novel and desirable manner.

Another object is to provide an improved method of assembling grid complement means on grid structures wherein the grid complement means is characterized by self-registering side portions which may selectively overlie parts of the grid structure means when these components are engaged with one another. Another object is to provide a grid complement and grid means constructed and arranged to receive and hold tubular bodies in partially distended positions in spaced relation to the spine portions of the grid means.

Still another object of the invention is to provide methods of operating a lead-acid battery whereby energy conservation may be realized.

Still another specific object is to construct a battery characterized by a reduction in self discharge rate as a result of which the shelf life of the battery may be substantially extended.

Yet another object is to improve the charging efficiency of a lead-acid battery and to reduce the magnitude of required maintenance charge currents.

It has been found that these objects may be realized, in accordance with the invention, by providing shaped grid surfaces and grid complement means for fitting therewith in self-registering relationship. The grid complement means comprises enclosure means including angularly displaceable side wall portions which may be located within electrode tubes so as to engage and maintain upper portions of the said tubes in distended relationship.

The invention is further characterized by methods of operating a lead-acid battery wherein grid complement means function to restrict direct flow of electrical current from the grid top bar and lug through the electrolyte to the negative electrode, thereby directing the current flow substantially in its entirety through the spines and active material of the positive electrode. Such a directed flow of current is operable to improve charging annd discharging efficiency, to substantially reduce self-discharge rates and to reduce electrolysis of the water of the electrolyte.

BRIEF DESCRIPTION OF THE DRAWINGS

FIG. 3 is a perspective view of a positive electrode utilized in carrying out methods of the invention.

FIG. 4 is a perspective view of the grid structure of the invention.

FIG. 5 is a front elevational view of portions of the grid structure shown in FIG. 4.

FIG. 6 is a plan view of portions of the grid structure of FIG. 4.

FIG. 7 is an end elevational view of the grid structure of FIG. 4.

FIG. 8 is an opposite end elevational view of the grid structure of FIG. 4.

FIG. 9 is a perspective view of grid complement means of the invention.

FIG. 10 is a plan view illustrating portions of the grid complement structure of FIG. 9.

FIG. 11 is an end elevational view of the grid complement structure of FIG. 9.

FIG. 12 is an opposite end elevational view of the structure of FIG. 9.

FIG. 13 is a cross-section taken on the line 13—13 of FIG. 10.

FIG. 14 is a cross-section taken on the line 14—14 of FIG. 10.

FIG. 15 is a plan view illustrating a step in the assembly of the positive electrode means.

FIG. 20 is a partial front elevational view illustrating a portion of a grid-and-grid complement assembly.

FIG. 21 is an end elevational view, partially broken away, of the structure shown in FIG. 20.

FIG. 22 is a diagrammatic representation illustrating another step in the assembly of the electrode means utilized in carrying out the invention.

FIG. 23 illustrates diagrammatically a final step in assembly of tubes to the grid-and-grid complement assembly of the invention.

DETAILED DESCRIPTION OF THE INVENTION

The invention disclosure as embodied in FIGS. 1–31 may be regarded as presenting at least three inventive aspects. Thus, one important aspect deals with the combination of shaped grid structures with enclosure bodies constituting self-registering grid complement components of unique nature, as illustrated in FIGS. 1–14.

Secondly, engagement of self-registering grid complement means with shaped grid surfaces is carried out in a novel manner which is believed not be be known to the art; this is illustrated in FIGS. 15–25.

Thirdly, energy efficient methods of employing guided current flow paths are disclosed to provide improved battery operation when a battery is being charged, being discharged through a load, or is in a self-discharging mode. FIGS. 26–30 illustrate these methods of battery operation.

Considering first the shaped grid structure and self-registering grid complement means of the invention, it will be understood that a plurality of these parts, assembled in complementary relationship, are employed in a typical lead-acid battery of the invention. Such an arrangement is illustrated in FIGS. 1 and 2, while FIGS. 3–14 are detailed Figures of a single shaped grid structure and a grid complement member engageable therewith.

Figure 1:
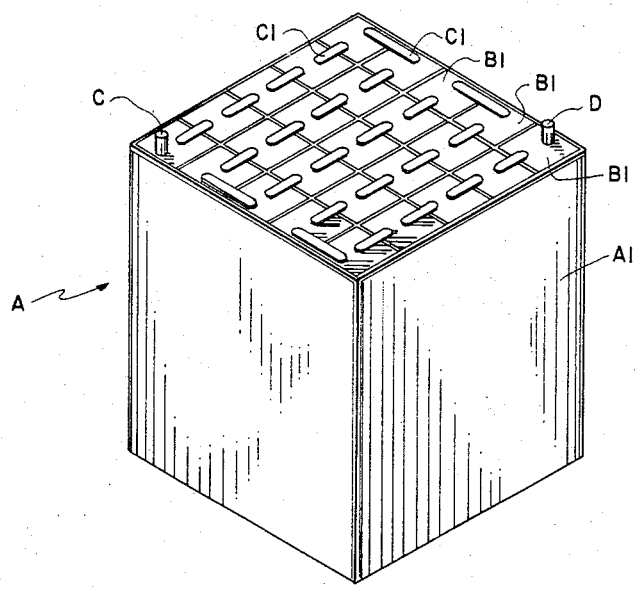
FIG. 1 is a perspective view illustrating in general a multi-cell lead-acid battery of the class employed in carrying out methods of operation of the invention.

Referring in more detail to the drawings, FIG. 1 illustrates a battery A comprising a tray A1 in which is received a plurality of cells as B1. The cells B1 are interconnected in series arrangement by means of cell connectors as C1. Opposite ends of this series arrangement present positive and negative terminals as C and D, respectively.

Figure 2:
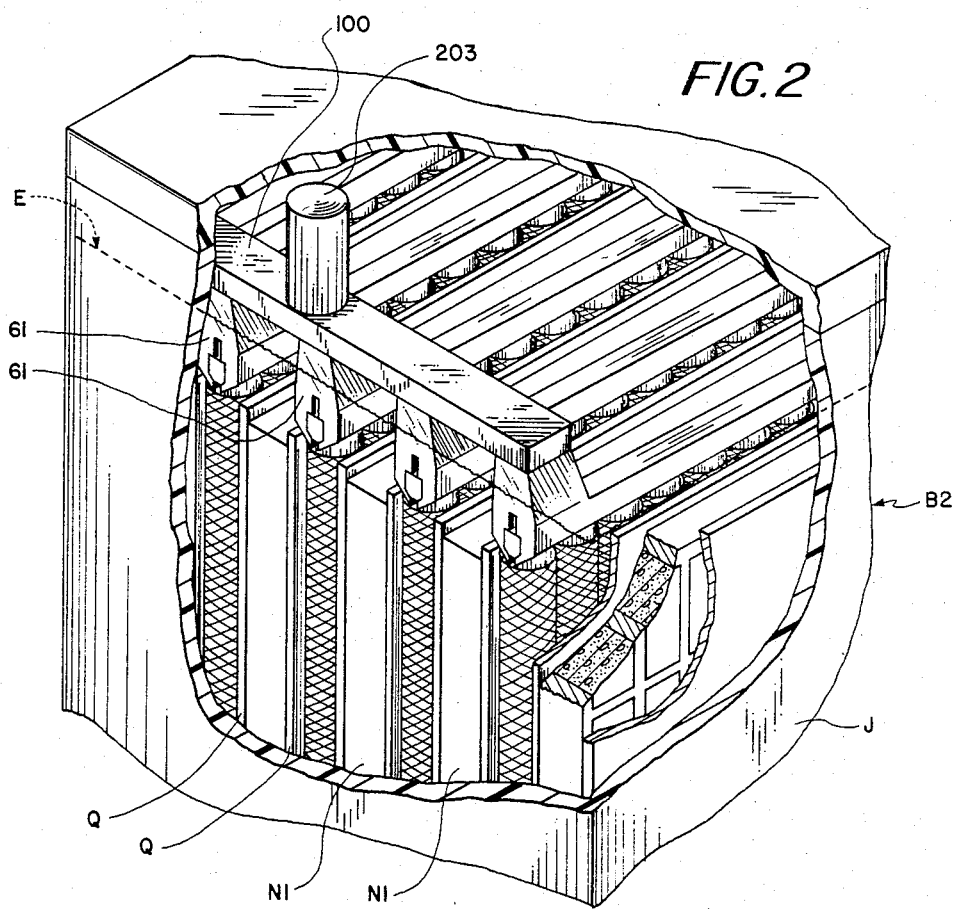
FIG. 2 is a perspective view, partially broken away, of one cell of a battery similar to that of FIG. 1.

FIG. 2 illustrates one cell, denoted by arrow B2, similar in construction to the cells as B1 in FIG. 1. Cell B2 includes a jar J. Contained within the jar J is a body of electrolyte, and an upper level of this electrolyte body is denoted by arrow E. Immersed in the electrolyte are positive tubular electrodes of the invention, which are supported in the cell together with the negative electrodes as N1 and intervening separator means as Q. Positive electrodes are interconnected by means of a lead bridge 100, on which extends upwardly a positive terminal 203.

In FIG. 3 a positive electrode denoted by arrow P1 is shown removed from the cell and includes a shaped grid structure and a self-registering grid complement G1 of the invention, together with tubular means as T1 in which active material is contained. A bottom bar L is engaged in lower ends of the tubular means. In FIG. 4 a shaped grid structure P2 is shown separately and comprises lug means 6, a top bar 4 and depending spines as 8 extending downwardly from the top bar. Lug means 6 is extended to provide a portion 6A which, after assembly, will project from the grid complement G1 thus facilitating interconnection of positive electrodes.

As shown in FIGS. 4–8, the top bar 4 is constructed with shaped surfaces 10, 12, 14 and 16 of predetermined configuration which provide converging flat surfaces at top and bottom sides of the top bar. Ends of top bar 4 may be provided with breakaway disposable hanger parts 18 and 20 which may be utilized as hereinafter disclosed.

It will be noted that the spines 8 are characterized by cross-sectional areas which increase in size as they merge with the top bar. These increased cross-sectional areas provide an increased current carrying mass of lead and also improve the corrosion resistance of the spines at these portions.

In accordance with the invention there is combined with the shaped grid structure disclosed a self-registering plastic grid complement which is shown in FIGS. 9–14 and denoted by arrow G1. It will be noted that this grid complement structure G1 includes a lug enclosure portion 22, a top bar enclosure portion 23 which is formed with upper shaped inner surfaces 24 and 26 of a predetermined converging angular configuration, and with self-registering similarly angled lower inner surfaces 28A and 30A which meet with angularly displaceable side portions 28 and 30.

When the side portions 28 and 30 revert to a normally undisplaced position surfaces 28A and 30A become firmly engaged against portions as 14 and 16, respectively of the top bar 4 lying between the spines as 8. In addition, the side walls 28 and 30 are extended to provide a plurality of opposing spaced apart tube retaining portions as 32 and 34 presenting tapered extremities as 32A and 34A, respectively, and which are formed with lower inner diverging surfaces as 32B and 34B and with lower outer inclined surface portions 32C, 34C for facilitating tube engagement.

At opposite ends of the grid complement, as most clearly shown in FIGS. 11 and 12, are provided holes denoted by numerals 36 and 38 through which may be received disposable grid hanger portions 18 and 20 of the grid structure, respectively. A feature of this arrangement is that these holes 36 and 38 may be conveniently extended to form slits 40 and 42, respectively, which are operative to facilitate angular flexing of the side wall portions 28 and 30 in the manner suggested in FIGS. 17 and 18.

FIG. 15 illustrates assembly apparatus of the invention which in general is denoted by the arrow W and is employed to carry out three successive steps of assembly including:

(a) positioning a grid complement means in the assembly apparatus;

(b) inserting the grid structure means within the grid complement means; and (c) engaging tubular means around side portions of the grid complement means.

Apparatus W comprises a flat bed structure in one portion of which grid complement means of the invention may be received in a substantially horizontally disposed position and on another portion of which grid structure means may be horizontally disposed in spaced apart relation to the grid complement means. It will be understood that the flat bed structure may be positioned on the upper side of a suitable base W1 which may be constituted by a bench, table, or the like.

The flat bed structure W is of substantially rectangular configuration as is shown in FIG. 15 and is formed along one side with a grid complement holder part W2 in which is provided a retainer slot W1'. At an opposite side, the flat bed structure W is formed with a horizontally extending fluted slide surface W3 (FIG. 16) and an intermediate portion of the bed structure is recessed to provide a clearance channel W4 defined by a relieved surface W5.

As noted above, the holder part W2 of the flat bed structure W has formed at one end thereof a retainer slot W1'. Positioning the grid complement in the flat bed structure is carried out by first inserting a lug enclosure portion 22 of grid complement G1 in retainer slot W1' as has been illustrated diagrammatically in FIG. 15.

As this insertion is carried out an upper V-shaped edge Y of the grid complement G1 moves into abutting relation with an inner face W8 of the holder portion W1 so that further insertion of the lug enclosure portion 22 is prevented. It will be noted from FIG. 16 that the side portion 28 of the grid complement extends across the channelled area and lies in spaced relation to lower surface W5 of channel W4 and thus the side 28 is free to become displaced downwardly, as suggested in FIGS. 17 and 18.

FIG. 15 also shows diagrammatically a grid structure including a lug portion 6, a top bar 4 and spines as 8 shown fragmentarily and this grid structure is resting on the upper slide surface W3 of the flat bed W. This positioning of the grid structure and the grid complement is more clearly shown in FIG. 16.

Figure 16:
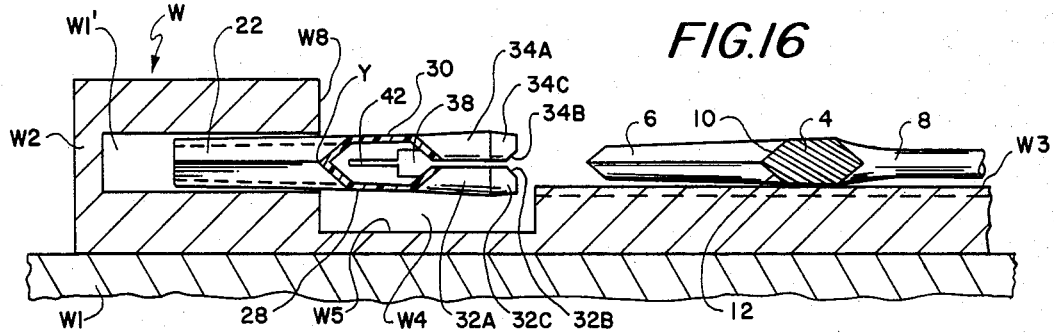
FIG. 16 is a cross-section taken on the line 16—16 of FIG. 15.
Figure 17:
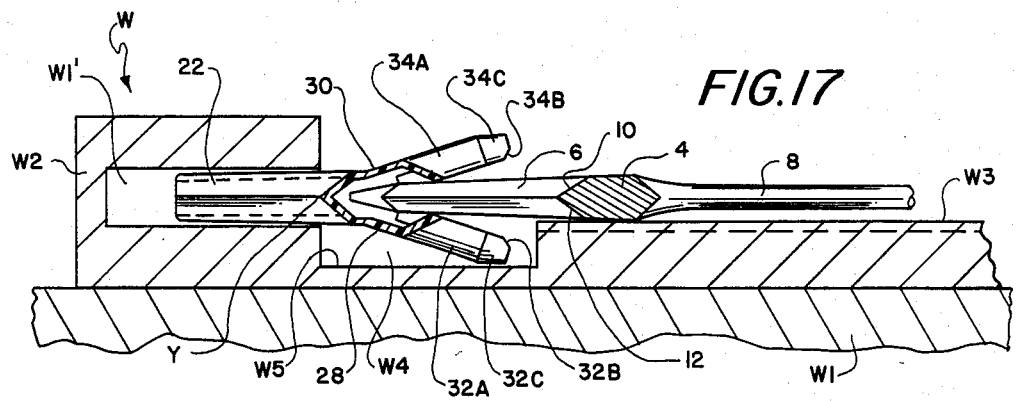
FIG. 17 is a view similar to FIG. 16, but showing further advancement of the parts with respect to one another.

Thus, in carrying out the method of assembly of the invention the lug enclosure portion 22 of the grid complement G1 is first inserted in the retainer slot W1' of holder portion W1, as shown in FIGS. 15 and 16. Thereafter the grid structure is moved along the fluted slide surface W3 into a position in which the top of the lug portion 6 begins to engage between inner diverging surfaces 32B and 34B of the grid complement member. Further advancement, as shown in FIG. 17, causes angular displacement of side wall portions 28 and 30.

Figure 18:
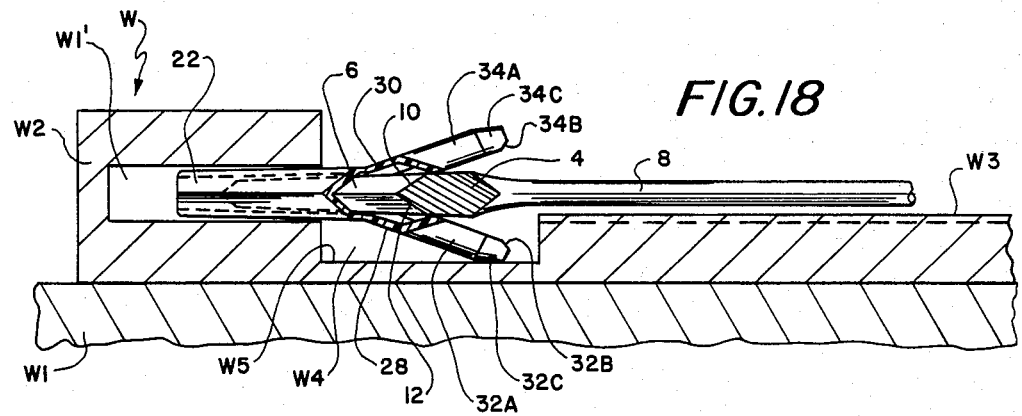
FIG. 18 is a view similar to FIG. 17 showing still further advancement.
Figure 19:
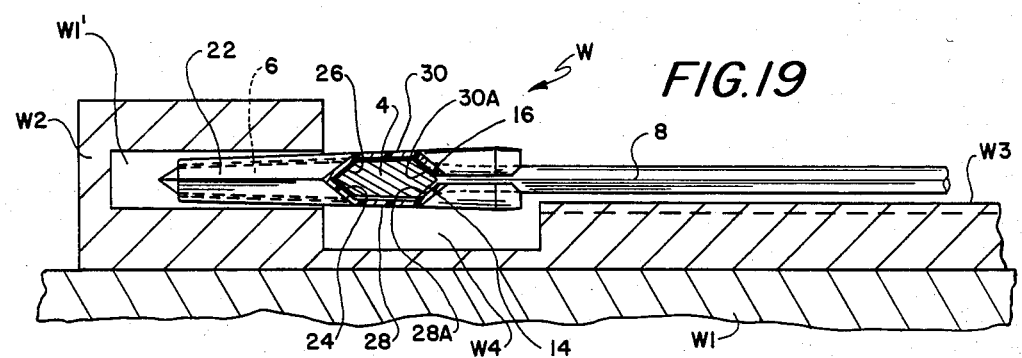
FIG. 19 is a view similar to FIG. 18, but showing surfaces of the grid complement in final self-registered relationship with the grid structure.

Still, further insertion of the grid is then carried out such that lug 6 starts to enter lug enclosure 22, as shown in FIG. 18. This further advancement causes angular displacement of said side wall portions 28 and 30 to occur along the entire length of the grid complement member. In FIG. 19 final advancement is illustrated with the upper shaped portions of the top bar becoming engaged against shaped surfaces 24 and 26 of the grid complement, upon which displaceable side wall portions 28 and 30 revert to their normal position. Thus, self-registering surfaces 28A and 30A of the grid complement become seated against surfaces 14 and 16 of the top bar. This completes the second step of assembly of the invention.

FIGS. 20 and 21 illustrate the assembly thus produced and removed from the assembly apparatus.

As shown in FIG. 22, a third step is carried out by first positioning tube means as T1 on the fluted slide surface W3 and, in order to facilitate the positioning of the tube members, the fluted slide surface W3 has fluted sections W10, which, as may be observed for example from an inspection of FIG. 15, may be constructed with arcs of curvature having the same radius as the arc of curvature of the tube means T1. Tube means as T1 are engaged around lower ends of the spines as 8.

FIG. 23 illustrates advancement of the tube means T1 over the tube retaining parts 32 and 34 of the grid complement, during which inclined surface portions 32C and 34C provide lead surfaces to facilitate engagement. Advancement of the tubes over the tube retaining parts 32 and 34 is continued until the tube tops contact lower ends of surfaces 28B and 30B of the grid complement.

Figure 24:
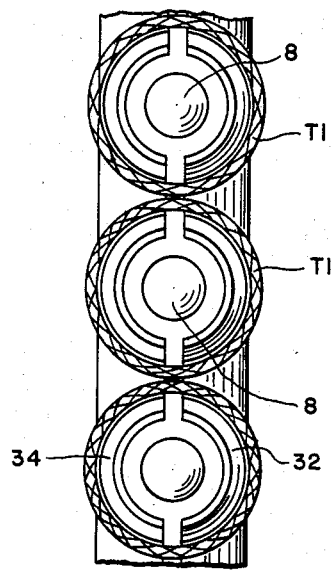
FIG. 24 is a bottom plan view of the structure produced by the step of FIG. 23.
Figure 25:
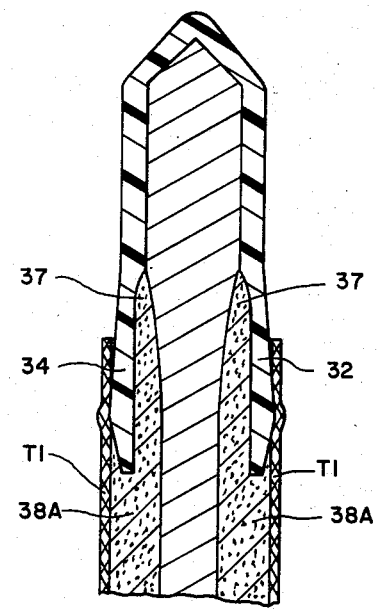
FIG. 25 is a cross-sectional view taken on the line 25—25 of FIG. 3.

It is pointed out that, in this fully advanced position, upper ends of the tubes are maintained in a distended state by expansion forces exerted by tube retaining parts 32 and 34, as suggested in FIG. 25. FIG. 24 illustrates these component parts in assembled relationship. In FIG. 25 active material 38A is shown received in the tubes as T1 and a bottom bar L may then be attached in the bottoms of the tubes T1 as indicated in FIG. 3.

It will be observed that by the arrangement of parts disclosed a portion 37 of the active material 38A may occur, as shown in FIG. 25, in a space which extends above the tops of the tube means T1, and that this active material is confined by the tube retaining parts 32 and 34 of the grid complement.

As earlier pointed out, the grid structure may include, at opposite ends thereof, breakaway hanger portions 18 and 20 which are received in holes 36 and 38, respectively, of the grid complement member. During electrochemical formation of the electrodes these hanger portions are utilized to (1) provide mechanical support for the electrodes in an electrolyte bath, and (2) provide a path for electrical flow of current to the grid structure of the electrodes. After electrochemical formation these portions 18 and 20 may be broken off and discarded.

It will be understood, however, that thinned portions 18A and 20A (FIGS. 5 and 6) may remain on the grid structure protruding through respective holes 36 and 38 in the ends of the grid complement. The eutectic point of an antimony-bearing alloy is such that antimony will tend to be concentrated at surface areas of a casting molded from such an alloy, and therefore the antimony content of the thinned portions 18A and 20A remaining will not be objectionable.

When a plurality of positive electrodes of the invention are to be interconnected with one another in a single cell electrical interconnection may be made with a lead bridge extending between upper exposed portions 6A of lugs as 6. This lead bridge, denoted by the numeral 100 in FIG. 2, may be fabricated from an antimony-free lead alloy.

As earlier noted a further inventive aspect relates to energy efficient methods of operating a lead-acid battery employing guided current paths made possible by the grid complement means. Each of these methods of operation is characterized in that a flow of current of a required initial value is initiated in the electrodes and the electrolyte and then directed through enclosed grid portions of the positive electrode along guided paths of current flow. Other paths of flow, which bypass the active material, are restricted. Therefore, current flow substantially in its entirety is conducted through the active material in an energy efficient manner.

Thus, in carrying out the charging method of the invention a flow of current is initiated by connecting a battery of the invention to standard battery charging means thereby impressing a flow of current from the charging means through the positive electrodes, grid portions of which are enclosed within grid complement means which restrict unwanted current dissipation. Thereafter, this impressed flow of current is directed through the active material of the positive electrode with energy conservation being realized.

It has been determined by extensive experimentation that carrying out battery charging in such a manner inhibits undesirable current dissipation and provides energy efficient results of an unexpected nature.

Figure 26:
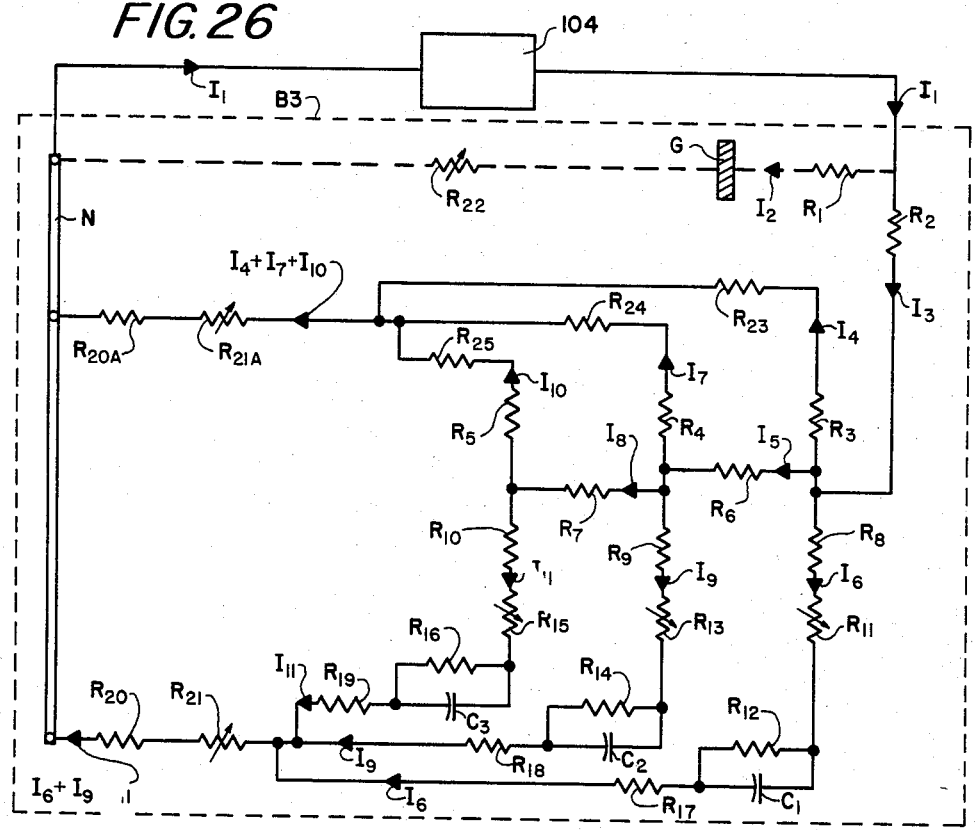
FIG. 26 is a diagrammatic view illustrating an electrical circuit analogue of a battery of the invention during charging.

This improved method of charging a battery has been illustrated diagrammatically in FIG. 26, wherein is shown a diagrammatic representation of an electrical circuit simulation of one example of a tubular lead-acid storage battery cell B3 indicating paths of current flow normally present, such as would occur in the cell B2 earlier noted.

Also shown diagrammatically is battery charging means 104 connected to the electrical circuit simulation noted to impress a current flow into elements of the cell.

The cell may include (1) negative electrode means indicated in the diagram by the bus bar N, and (2) tubular positive electrode means comprising:

(a) a grid structure including a lug, a top bar and three depending spines;

(b) three masses of positive active material substantially cylindrical in shape surrounding and in contact with respective spines; and (c) three bodies of foraminous or perforated material surrounding the masses of active material, (3) foraminous separator means, and (4) electrolyte.

The battery components listed in (2), (3) and (4) above are represented in FIG. 26 by resistances and, in discussing these resistances, a distinction is made between "surface resistance" and "actual resistance". The term "surface resistance" as employed in the specification is intended to define the electrical resistance of an interface between a mass of lead or active material and an electrolyte. The term "actual resistance" is intended to define the resistance to a flow of electrical current through a body of material, and will be dependent upon the conductivity of the said material as well as upon its cross-sectional area.

Referring in more detail to FIG. 26, the lug of the positive electrode means is represented by two resistive elements $R_1$ and $R_2$ where $R_1$ is the "surface resistance" of the lug, and $R_2$ is the "actual resistance" of the said lug. Customarily the "surface resistance" will be quite high and the "actual resistance" quite low, since good practice involves minimization of lug surface area for a required lug cross-sectional area.

The top bar of the positive electrode means of this example may be represented by five resistive elements, $R_3$ through $R_7$ inclusive, where $R_3$, $R_4$ and $R_5$ each represent the surface resistance of one-third of the top bar and $R_6$ and $R_7$ each represent the actual resistance of one-half of the said top bar. Again, the ohmic value of the surface resistances may be quite high, and that of the actual resistances quite low, since good practice again calls for minimization of surface area of the top bar for a required cross-sectional area.

The actual resistances of the three depending spines are represented by resistive elements $R_8$, $R_9$ and $R_{10}$.

Each of the three masses of active material is represented by a combination of three elements, two resistive and one capacitive. These elements are denoted by the reference characters $R_{11}$–$R_{16}$ and $C_1$–$C_3$ inclusive. Resistive elements $R_{11}$, $R_{13}$ and $R_{15}$ represent the actual resistance of the active material masses, while capacitive elements $C_1$, $C_2$ and $C_3$ represent the electrochemical storage characteristics of the respective active material masses. It is pointed out that capacitive elements $C_1$, $C_2$ and $C_3$ are not true electrical analogues of this energy storage capability, since in an actual battery energy is stored in a chemical rather than in an electrical form.

It is pointed out also that current flow is shown as passing through these capacitive elements, which in an actual circuit model might not be the case.

Inefficiencies in the electrochemical energy storage process as well as the surface resistance of the active material mass are shown combined in resistive elements $R_{12}$, $R_{14}$ and $R_{16}$.

The three tubes, whose resistance to current flow is determined by their porosity, are represented by resistive elements $R_{17}$, $R_{18}$ and $R_{19}$. These are normally as low as possible in ohmic value.

Located between the positive electrode means and the negative electrode means is separator means of a foraminous nature containing an electrolyte. The actual resistance of the separator means, which is governed by its porosity and is normally quite low in ohmic value, is represented by resistive elements $R_{20}$, $R_{20A}$, while the resistance of the electrolyte is represented by $R_{21}$, $R_{21A}$.

Above the separator means generally exists some quantity of uncontained or "free" electrolyte. The actual resistance of this free electrolyte is represented by resistive element $R_{22}$.

In accordance with the method of the invention there is combined with the circuit diagram of FIG. 26 above described a grid complement member. It will be understood that the grid complement member surrounds the positive electrode lug and portions of the grid top bar which in a conventional battery are exposed to electrolyte. That portion of the grid complement member which surrounds the lug is shown diagrammatically in block form and is denoted by reference character G. Additional resistive elements $R_{23}$, $R_{24}$, $R_{25}$ simulate those portions of the grid complement which overlie and enclose those portions of the top bar represented by resistive elements $R_3$, $R_4$ and $R_5$.

Operation of the battery of FIG. 26 may be conveniently described by superimposing on the circuit diagram current flow paths initiated in the battery. Thus, total current from the battery charging means is indicated by the arrow $I_1$ which is superimposed at the upper right hand side of the diagram as viewed in FIG. 26.

As an aid to more fully understanding the manner in which the grid complement functions it is believed to be helpful to first describe the current flow paths which occur in a conventional battery and are present in the diagram, and their relationship with respect to the various resistances earlier noted.

Normally, current flow $I_1$ becomes divided in the lug portion of the grid structure into two current portions $I_2$ and $I_3$. Current flow $I_2$ passes through surface resistance $R_1$ through electrolyte resistance $R_{22}$ and thence to the negative electrode.

It is pointed out that, in this case, resistance $R_{22}$ of the electrolyte is variable. This is because the specific gravity of the electrolyte changes during charging, starting off at a minimum and reaching a maximum at end-of-charge. Since the resistance of an electrolyte varies in an inverse relationship with specific gravity, resistance $R_{22}$ will reach a minimum at end-of-charge. $I_2$ will gradually increase, therefore, until the battery has reached a steady state.

Current flow component $I_3$ flows into the top bar, where it becomes divided into three components $I_4$, $I_5$ and $I_6$. Component $I_4$ flows through surface resistance $R_3$, and thence through separator means and electrolyte, represented by $R_{20A}$ and $R_{21A}$, respectively, to the negative electrode means. It is pointed out that the resistive components representing the electrolyte contained in the separator means, i.e. $R_{21}$ and $R_{21A}$, are shown as variable resistances whose behavior will be substantially the same as that of $R_{22}$. $I_4$ will thus exhibit a varying and increasing magnitude during charge until a steady state has been reached, as was disclosed with respect to $I_2$.

Current component $I_6$ flows through the spine represented by resistive element $R_8$, through the active material body represented by resistive element $R_{11}$, through the resistor-capacitor combination $R_{12}$–$C_1$ representing the energy storage reaction, through the tube wall represented by $R_{17}$, and thence through electrolyte $R_{21}$ and separator means $R_{20}$ to the negative electrode. It is pointed out that the resistive element $R_{11}$ representing the active material body is variable; this illustrates in part the changing composition of the active material during charge. At the beginning of charge this composition is largely highly resistive $PbSO_4$; during charge this $PbSO_4$ becomes gradually transformed into more conductive $PbO_2$. Resistance $R_{11}$ will therefore begin at a maximum and decrease in value, reaching a minimum at end-of-charge.

The electrochemical energy storage capability of the active material is represented by capacitive element $C_1$. Current $I_6$, less some losses due to inefficiencies in the charging process (these inefficiencies represented by the parallel current path through resistive element $R_{12}$) flows through capacitive element $C_1$ and gradually charges this element to a voltage equivalent to the power supply voltage less the voltage drops across series elements $R_2$, $R_8$, $R_{11}$, $R_{17}$, $R_{21}$ and $R_{20}$. As $C_1$ becomes charged the current flowing through this element will gradually decrease, finally substantially terminating when $C_1$ is fully charged. At this point $I_6$ will comprise only the current component flowing through $R_{12}$ and a small current component required to maintain the charge on $C_1$.

It is pointed out, however, that elements $R_{11}$ and $R_{21}$ are variable and decrease in resistance during charging. This allows $C_1$ to be charged to an increasingly higher voltage until a steady-state condition is achieved at end-of-charge.

Current component $I_5$ flows through that portion of the top bar represented by resistive element $R_6$ and then becomes divided into three components $I_7$, $I_8$ and $I_9$. Component $I_7$ behaves similarly to $I_4$ while component $I_9$ behaves similarly to $I_6$, albeit in their own flow paths.

$I_8$ flows through the remainder of the top bar as represented by resistive element $R_7$ whereupon, in this example, it becomes divided into two components $I_{10}$ and $I_{11}$. $I_{10}$ corresponds to $I_4$ and $I_{11}$ corresponds to $I_6$ of the foregoing discussion.

The following relationships are evident:

$$I_1 = I_2 + I_3$$

$$I_3 = I_4 + I_6 + I_7 + I_9 + I_{10} + I_{11}.$$

In addition resistances $R_6$ and $R_7$ may be so low as to be considered negligable; therefore, assuming that:

$$R_8 = R_9 = R_{10}$$

$$R_{11} = R_{13} = R_{15}$$

$$R_{12} = R_{14} = R_{16}$$

$$C_1 = C_2 = C_3$$

$$R_{17} = R_{18} = R_{19}$$

it may be said that for all practical purposes:

$$I_6 = I_9 = I_{11}.$$

Also, assuming that:

$$R_3 = R_4 = R_5$$

it may be said that:

$$I_4 = I_7 = I_{10}.$$

Therefore, for this example, $$I_3 = 3I_4 + 3I_6.$$

A steady-state condition for this conventional battery must be represented by replacing various resistances as $R_{22}$, $R_{21}$, $R_{11}$, $R_{13}$, $R_{15}$, $R_{21A}$ with fixed resistive elements. In this steady-state condition the battery charging means 104 will provide a "trickle" or maintenance current sufficient to maintain the state-of-charge of capacitive elements $C_1$, $C_2$ and $C_3$. All resistive elements are now at their fixed steady-state or minimum value, and only that current required to maintain the capacitive elements $C_1$, $C_2$ and $C_3$ at their fully-charged voltage flows through these capacitive elements. All other currents, however, continue to flow.

Consideration of this steady-state condition will show that current components $I_2$, $I_4$, $I_7$ and $I_{10}$ provide no useful function whatsoever insofar as charging or maintaining the state of charge of the capacitive elements $C_1$, $C_2$ and $C_3$.

It will be apparent that these currents will produce unwanted heating of the battery and electrolysis of the water of the electrolyte. It is therefore desirable to eliminate or substantially reduce the magnitude of these current components, both from the standpoint of energy conservation and charge efficiency as well as for a reduction in watering. This is accomplished by the use of a grid complement member as suggested in FIG. 26 and operation of the invention method will now be disclosed in more detail.

Since the lug is entirely surrounded by insulating material G, no current may flow through surface resistance $R_1$ and the electrolyte $R_{22}$ to the negative electrode, and thus current $I_2$ has been eliminated. $I_3$, therefore, will be equal to $I_1$.

The exposed surfaces of the top bar are also masked by insulating material, but it may be somewhat impractical to attempt to achieve a complete masking of these surfaces. A masking of at least 99% of these surfaces, however, may be readily achieved. Therefore, the ohmic value of resistance elements $R_{23}$, $R_{24}$ and $R_{25}$, which represent this masking, may be assumed to be at least 99 times greater than the ohmic values of the surface resistances $R_3$, $R_4$ and $R_5$, respectively. Current components $I_4$, $I_7$ and $I_{10}$ will, therefore, be reduced by at least 99% in a battery of the invention. These conditions will hold during all phases of battery operation.

Figures 27A, 27B:
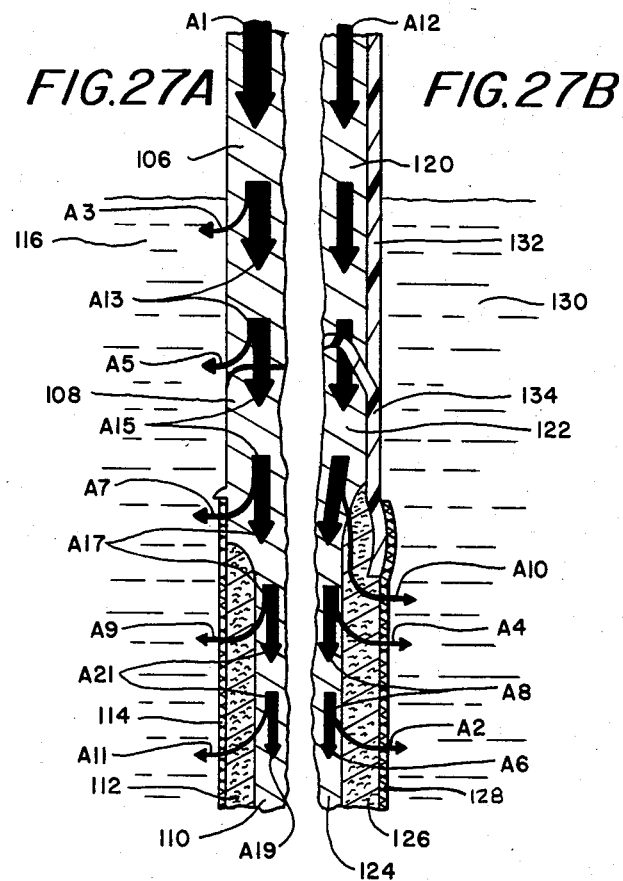
FIG. 27A is a diagrammatic view showing paths of electrical current flow through a conventional tubular positive electrode.
FIG. 27B is a view similar to FIG. 27A, but illustrating electrical current flow through a positive electrode of the invention.

In FIGS. 27A and 27B normal charging current flow and the directed charging current flow of the invention through a grid structure and positive electrode have been contrasted. In FIG. 27A a conventional electrode comprising a grid structure having a lug 106, a top bar 108 and depending spines (as) 110, and further including active material 112 contained within tube means 114 is shown immersed in an electrolyte body 116. Charging current, as represented by the arrow A1, is impressed upon the electrode via the lug 106.

Upon entering the portion of the electrode which is submerged in the electrolyte 116 current A1 becomes divided, over the entire submerged surface of the electrode, into several components represented diagrammatically by arrows A3, A5, A7, A9, A11. Thus current A3 will flow directly from the lug 106 into the electrolyte body, reducing continued current flow to remaining portions of the electrode to a value A13 such that:

$$A13 = A1 - A3.$$

Current A13 may be said to be similar to current $I_2$ of FIG. 26.

Similarly, upon entering the top bar 108, currents A5 and A7 flow directly from the top bar into the electrolyte. Thus:

$$A15 = A13 - A5$$

$$A17 = A15 - A7$$

and the sum of currents A5 and A7 may be said to be similar to the sum of currents $I_4$, $I_7$ and $I_{10}$ of FIG. 26.

Currents represented by arrows A9 and A11 flow through the active material 112 and thus provide a useful charging function. For any given tube of active material the sum of currents A9 and A11 may be said to be similar to currents $I_6$, $I_9$, or $I_{11}$ of FIG. 26.

In FIG. 27B a positive electrode of the invention comprising a grid structure having a lug 120, a top bar 122 and depending spines (as) 124, and further including active material 126 contained within tube means 128 is shown immersed in an electrolyte body 130. The electrode further includes grid complement means, portions 132 and 134 of which overlie and enclose surfaces of the lug 120 and top bar 122 respectively.

In contrasting the currents of FIGS. 27A and 27B, it is pointed out that it is desired to have currents A2 and A4 of FIG. 27B equal currents A11 and A9, respectively, of FIG. 27A in order to properly charge the active material 126. Thus:

$$A6 \text{ (FIG. 27B)} = A19 \text{ (FIG. 27A)}$$

$$A8 \text{ (FIG. 27B)} = A21 \text{ (FIG. 27A)}.$$

Since a small additional quantity of active material (ref. number 37 in FIG. 25) is present in an electrode of the invention, an additional current A10 is present in the diagram of FIG. 27B. This current A10 may also be considered to include the very small leakage currents (as $I_4$, $I_7$, $I_{10}$ of FIG. 26) present in an electrode of the invention. Charging current supplied to the electrode of FIG. 27B may therefore be substantially smaller than the charging current A1 supplied to the electrode of FIG. 27A, such that $$A12 \sim A1 - A3 - A5 - A7 + A10.$$

Figure 28:
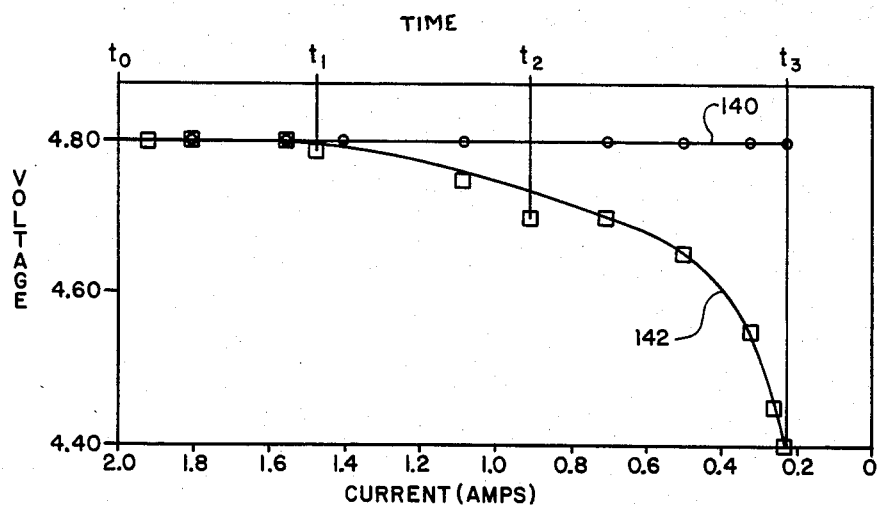
FIG. 28 is a graphical representation contrasting charging characteristics of a conventional battery and a battery of the invention.

FIG. 28 illustrates graphically the effect of this reduced charging current requirement in batteries undergoing a "series charge". The values shown were obtained experimentally, using 4-volt (two cell) 14 ampere-hour batteries, each cell having a single positive electrode including six tubes of active material. In conducting these tests, one such battery using conventional positive electrodes was charged in series with a similar battery of the invention (in which the positive electrodes included grid complement means), and charging current was continuously adjusted to maintain the battery of the invention at 4.80 volts. Curve 140 represents the battery of the invention, while curve 142 represents the conventional battery.

Since equivalent amounts of active material were present in each battery, initially (i.e. at time $t_0$) both batteries were maintained at 4.80 volts with 2.0 amperes of charging current. The two batteries remained equivalent until time $t_1$, when the conventional battery began to exhibit a decreasing voltage (indicating that more current would be required to maintain this battery at 4.80 volts). Thus at time $t_2$, with a charging current of 0.9 amperes required to maintain the battery of the invention at 4.80 volts, the conventional battery was only able to maintain 4.70 volts. Similarly, at time $t_3$ when only 0.2 amperes of charging current was required to maintain the battery of the invention at 4.80 volts, the conventional battery was only able to maintain 4.40 volts. Clearly, therefore, the battery of the invention demonstrated substantially improved charging efficiency.

The period of time represented in FIG. 28 by that time which extends from that time $t_1$ through $t_3$ and beyond illustrates in part the "trickle" or maintenance charge characteristics of the two battery operations. In particular, at time $t_3$ only 0.2 amps of charging current was required to maintain the battery of the invention at 4.8 volts state of charge. On the other hand, at time $t_3$ the conventional battery was only able to maintain 4.0 volts at 0.2 amperes.

Therefore, if one considers both batteries to have been fully charged at time $t_3$, the required or maintenance charge for the battery of the invention would only be 0.2 amperes. In comparison the conventional battery would require a substantially higher current in order to maintain this 4.80 volt level.

Thus, it has been demonstrated that a battery of the invention requires a "trickle" or maintenance charge current which is substantially less than that required by a conventional battery.

This improved charging efficiency, in addition to conserving energy and reducing heat within the battery, may provide an additional benefit when the grid structures of the positive electrodes are fabricated from an antimony-free alloy. This may be most clearly understood with further reference to FIG. 26.

Conventional tubular batteries of an antimony-free nature have heretofore been subject to a phenomenon of "barrier layer formation" which has severely limited their utility in repeated deep discharge applications. In such batteries, since no antimony is present to permeate the active material and thus insure electrical continuity between the spines and the active material of the positive electrodes, barrier layers of lead sulfate ($PbSO_4$) tend to form about the spines during deep discharge. This has the effect of greatly increasing the ohmic value of equivalent resistive components $R_{11}$, $R_{13}$ and $R_{15}$. Whereas antimony would provide a current flow path through these barrier layers in a conventional battery, in an antimony-free battery it is extremely difficult to force sufficient current through these layers to transform them back into $PbO_2$. To provide sufficient current it is necessary to increase the voltage of the charging means, which in turn increases the value of current $I_2$ (thus increasing electrolysis of the water of the electrolyte and corrosion of the lug) and the value of currents $I_4$, $I_7$, $I_{10}$ (also increasing electrolysis and causing corrosion). Since antimony-free batteries are intended to be maintenance-free, increased electrolysis cannot be tolerated. Also, increased corrosion would decrease battery life.

In a battery of the invention as previously disclosed current $I_2$ is substantially eliminated, and currents $I_4$, $I_7$ and $I_{10}$ are reduced to less than 1% of their corresponding value in a conventional battery. Therefore, the charging voltage may be raised to a value sufficient to force electrical current through the barrier layers of $PbSO_4$ without significantly increasing either electrolysis or corrosion.

In addition, since corrosion of the top bar and lug has been minimized in any battery of the invention, electrolytes having a higher specific gravity may be employed without shortening battery life, even at higher temperatures.

Figure 29:
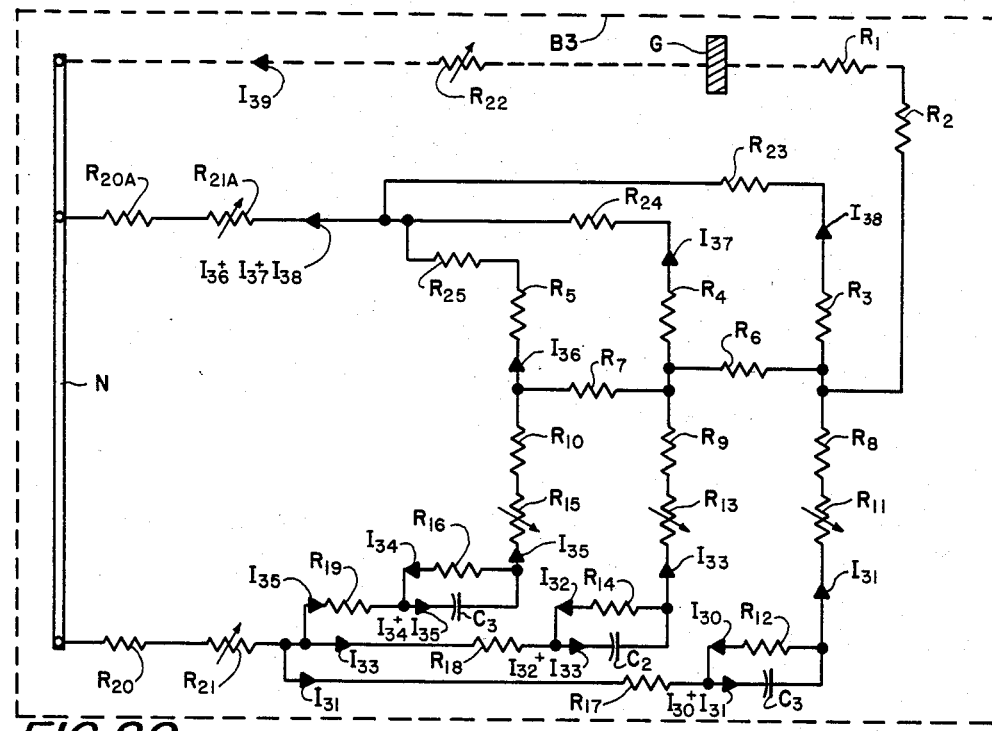
FIG. 29 is a diagrammatic view similar to FIG. 26 but illustrating the battery during self-discharge.

Use of a grid complement may also provide a reduced self-discharge rate as well as a more efficient operation under discharge through a load. FIG. 29 illustrates the cell B3 in a self-discharge mode; that is, the cell is neither being charged nor discharged through an electrical load.

During self-discharge, capacitive elements $C_1$, $C_2$ and $C_3$ will attempt to dissipate their charge. The self-discharge current may follow a variety of paths.

Considering first the capacitive element $C_1$, one current path will pass through resistive element $R_{12}$. This current, denoted $I_{30}$, is due primarily to the chemical propensity for $PbO_2$ to become $PbSO_4$ in the presence of $H_2SO_4$. This current also causes the "inefficiencies" in the charging process previously described in connection with $R_{12}$, $R_{14}$ and $R_{16}$. This current component is, however, quite small, and will decrease in magnitude as the charge on $C_1$ is dissipated.

A second current component, denoted $I_{31}$, flows through the active material mass $R_{11}$ and spine $R_8$ to the top bar.

Similar occurrences of current flow take place with respect to capacitive elements $C_2$ and $C_3$. These current flows are indicated by $I_{32}$, $I_{33}$ and $I_{34}$, $I_{35}$ respectively.

It is pointed out that active material masses $R_{11}$, $R_{13}$ and $R_{15}$ are represented by variable resistance elements. These elements will be at a minimum ohmic value at the start of the self-discharge process, gradually increase as the $PbO_2$ of the active material becomes sulfated to $PbSO_4$, and achieve a maximum when the charge on the capacitive elements $C_1$, $C_2$ and $C_3$ respectively has been dissipated. Current components $I_{31}$, $I_{33}$ and $I_{35}$ will, therefore, descrease in magnitude both due to charge dissipation and the in increase in $R_{11}$, $R_{13}$ and $R_{15}$ respectively (as well as for other reasons, e.g. changes in electrolyte resistances $R_{22}$, $R_{21}$, $R_{21A}$).

Upon reaching the top bar currents $I_{31}$, $I_{33}$ and $I_{35}$ may be considered to be added together and then redistributed into four components, $I_{36}$, $I_{37}$, $I_{38}$ and $I_{39}$, such that:

$$I_{31}+I_{33}+I_{35}=I_{36}+I_{37}+I_{38}+I_{39}.$$

In a conventional battery current component $I_{39}$ flows through the lug $R_2$, surface resistance $R_1$ and electrolyte resistance $R_{22}$ to the negative electrode means. It is pointed out that electrolyte resistance $R_{22}$ is variable due to the changing specific gravity of the free electrolyte; its ohmic resistance will gradually increase during the self-discharge process, thus decreasing the value of current component $I_{39}$.

Since top bar resistances $R_6$ and $R_7$ are extremely small, $I_{36}$, $I_{37}$ and $I_{38}$ may be considered to be substantially equal in value. These components flow through top bar surface resistances $R_5$, $R_4$ and $R_3$, respectively, through separator resistance $R_{20A}$ and variable electrolyte means $R_{21A}$ to the negative electrode. It is pointed out that the behavior of $R_{21A}$ will be substantially similar to that exhibited by $R_{22}$.

Current components $I_{36}$, $I_{37}$, $I_{38}$ and $I_{39}$ are combined in the negative electrode and then pass through separator resistance $R_{20}$ and variable electrolyte resistance $R_{21}$, being redistributed into the three components $I_{31}$, $I_{33}$ and $I_{35}$ as shown.

The total self-discharge rate may be substantially reduced by the use of a grid complement member, represented by insulator G and resistive elements $R_{23}$ $R_{24}$ and $R_{25}$ as shown in FIG. 29. These elements are the same as those introduced in FIG. 26.

Current component $I_{39}$ is totally eliminated by the insulating material G surrounding the lug. Current components $I_{36}$, $I_{37}$ and $I_{38}$ will be reduced to no more than 1% of their previous value by the masking effect of the grid complement (represented by elements $R_{23}$ $R_{24}$ and $R_{25}$ respectively) on the surface of the top bar. Self-discharge, therefore, will be reduced to a value equal to or less than $I_{30}+I_{32}+I_{33}+(I_{31}+I_{34}+I_{35})$ (0.01) with respect to the values seen in a conventional battery. (It will be noted that, in FIG. 29, for a battery of the invention, $I_{31}=I_{38}$, $I_{33}=I_{37}$, $I_{35}=I_{36}$.

Since the self-discharge rate has been reduced a battery of the invention which is in a charge state will provide substantially extended shelf life during which the state of charge is appreciably maintained.

A similar increase in efficiency may be noted while operating a battery of the invention during a discharge mode through an electrical load.

Figure 30:
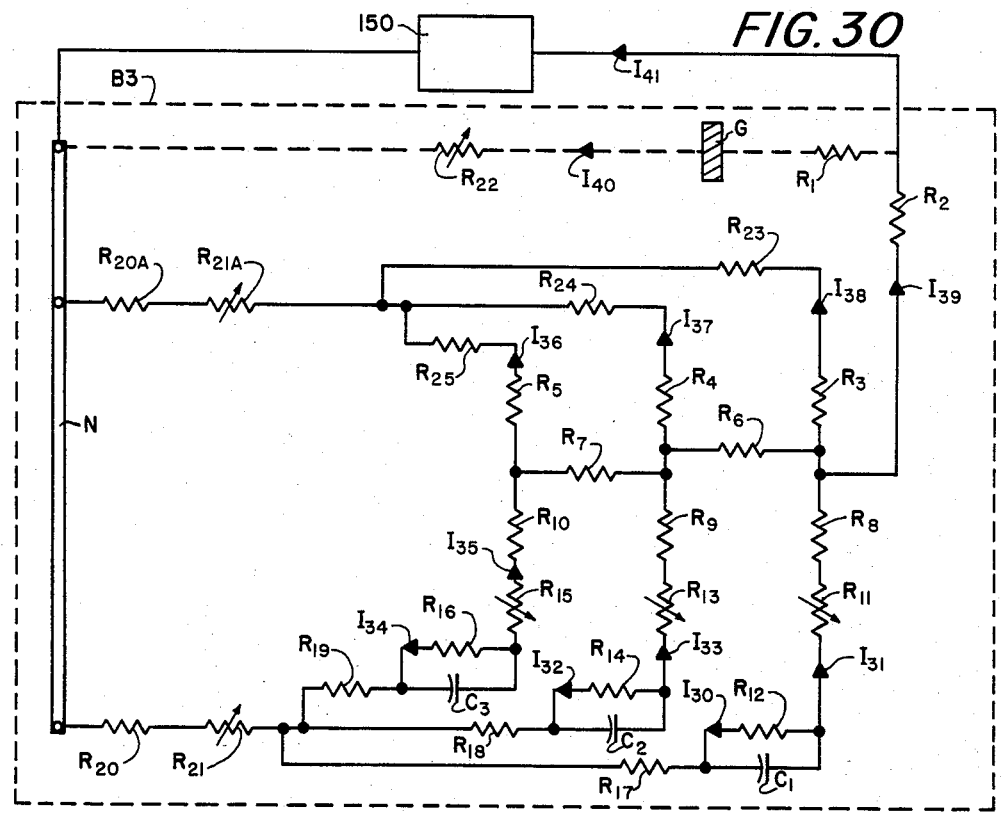
FIG. 30 is a diagrammatic view similar to FIG. 26 but illustrating the battery discharging through a load.

Referring in detail to FIG. 30, it will be noted that component characteristics duplicate those of FIG. 29. An electrical load 150 has been added, however, and thus the magnitude of certain current components have been dramatically increased.

The ohmic resistance of a load will generally be quite low in comparison to the self-discharge current paths within the battery, so the majority of current flow will be through the load. In FIG. 30 this current flow through the load is represented by current component $I_{41}$. It is pointed out that current component $I_{39}$ becomes divided into two components at the lug, one being this load current $I_{41}$ and the other, $I_{40}$, being the self-discharge current component through surface resistance $R_1$ and electrolyte resistance $R_{22}$. The magnitudes of current components $I_{31}$, $I_{33}$, $I_{35}$ and $I_{39}$ will, therefore, be several times greater than they were in FIG. 29 because of this additional current requirement. Electrical energy is still wasted, however, along flow paths $I_{30}$, $I_{32}$, $I_{34}$, $I_{36}$, $I_{37}$, $I_{38}$ and $I_{40}$, as was the case in FIG. 29. The total energy wasted may be somewhat less, however, since the dissipation of the charge on capacitive elements $C_1$, $C_2$ and $C_3$ as well as the increases in variable resistive elements $R_{11}$, $R_{13}$, $R_{15}$, $R_{21}$, $R_{22}$, $R_{214}$ will be much more rapid.

Thus, it will be seen that addition of a grid complement member, such as that disclosed, will eliminate the current path $I_{40}$ through $R_1$ as earlier disclosed, and will also dramatically reduce flow paths $I_{36}$, $I_{37}$ and $I_{38}$. This, in turn, will provide for an increased efficiency of operation during discharge by sharply reducing wasted electrical energy.

Figure 31:
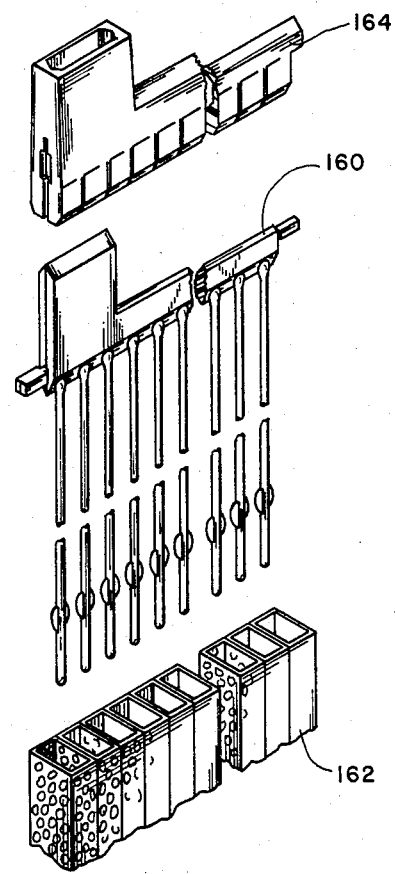
FIG. 31 is an exploded view of parts of a modified form of positive electrode of the invention.

It may be desired to manufacture batteries of the invention having tube means of some cross-sectional configuration other than round. This may be easily accomplished by varying the tube shape and the shape of the tube engaging parts of the grid complement means. FIG. 31 illustrates such a modification in exploded form, comprising a grid 160 (substantially the same as that of FIGS. 4-8), tube means 162 of square cross-section and corresponding grid complement means 164.

We claim:

1. A method of making a tubular positive electrode for use in lead-acid storage batteries wherein grid structure includes a lug portion, a top bar portion having a plurality of spaced apart spines extending therefrom and having shaped surfaces including converging flat surfaces at an upper side thereof and the said electrode further including tube means and a grid complement member comprising a lug enclosure portion and a top bar enclosure portion including angularly displaceable side portions, and said side portions of the grid complement being extended to provide elongated tube engaging surfaces and also having inner surfaces which are shaped to mate with the shaped surfaces of the top bar in self adjusting relationship thereto, said method being characterized in that the lug portion of the grid structure is first inserted into the lug enclosure portion of the grid complement with initial angular displacement of the side wall portions occurring, thereafter advancing the said grid structure into the grid complement to further angularly displace the said side wall portions, then advancing and engaging the top bar against the top bar enclosure into a position in which the said angularly displaceable side portions revert into self-registering relationship with the shaped portions of the top bar lying between the spines, thereafter distensibly fitting the tube means over the outer sides of the tube engaging surfaces, and finally advancing the tube means into contact with the side portions of the grid complement.

2. The method of claim 1 in which active material is thereafter introduced into the tube means to occupy spaces between the side portions, the top bar, the tube means and the spines.

3. The invention of claim 1 in which the said grid complement is first supported in a holder body in a horizontally disposed position and the lug enclosure portion of the grid complement is received in a retaining slot formed in the holder body, and the grid structure is then located on a slide surface in alignment with and in spaced relation to the grid complement.

4. The invention of claim 1 in which the said grid complement is first supported in a holder body in a horizontally disposed position and the lug enclosure portion of the grid complement is received in a retaining slot formed in the holder body, and the grid structure is then located on a slide surface in alignment with and in spaced relation to the grid complement, and the tube means is received in fluted portions of the slide surface of the holder body and is guided by these fluted portions of the slide surface as the tube means is finally advanced into engagement with the side portions of the grid complement means.

5. Lead-acid storage battery construction comprising a casing having electrolyte contained therein, positive and negative electrodes supported in the casing and immersed in the electrolyte, said positive electrode means including a grid structure consisting of a top bar, a lug portion extending from one side thereof and spaced apart spine portions extending outwardly from an opposite side thereof, said top bar presenting shaped spaced apart surfaces of a predetermined configuration, said electrode means further including active material and tube means for locating the active material around the spines and a plastic grid complement member for selectively enclosing portions of the said grid structure, said grid complement being formed with spaced apart angularly displaceable side portions which are selectively self-registering with the predetermined shaped surfaces of the grid structure when these components are in assembled relationship with one another.

6. A method of operating a lead-acid battery of the class which is constructed with a casing, electrolyte means received in the casing, positive and negative electrodes mounted in the casing in contact with the electrolyte and being spaced apart by separator means, said positive electrode means including grid structures comprising current carrying means, said positive electrode means further including active material, tube means, enclosure means engaged with portions of the current carrying means, and active material located around the current carrying means within the tube means and the enclosure means, said method characterized in that an electrical current is directed along guided paths of travel which are restricted in an energy conversing manner to paths all of which include passage through the active material and said current is first caused to flow through the electrodes, separator means and electrolyte, and the current is then directed through enclosed grid portions of the positive electrode along guided paths of travel in which current flow along paths which bypass the positive active material is restricted, and thereafter the flow of current, the value of which may vary, is conducted through the active material of the positive electrode in an energy conserving manner.

7. The method of claim 6 in which the battery is in a charging mode and the said current carrying means is of the antimony-free class having a top bar and spaced apart spines, the said electrical current being established at a value operable to electrochemically transform barrier layers of $PbSO_4$, which may be present around the spines, into $PbO_2$, and the guided paths of travel of said electrical current being operable to minimize the electrolysis of the electrolyte and also to minimize corrosion of the current carrying means.

8. The invention of claim 6 in which the battery is neither being charged nor discharged through a load and the said electrical current flow being provided by a self-discharge of the battery, the guided paths of current flow being operable to inhibit the magnitude of the said current flow and thus extend the shelf life of the said battery.

* * * * *